Patented Mar. 7, 1950

2,499,767

UNITED STATES PATENT OFFICE 2,499,767

DEFLUORINATION OF PHOSPHATE ROCK

Ernest J. Maust, Lakeland, Fla., assignor to Coronet Phosphate Company, New York, N. Y., a corporation of New York No Drawing. Application May 7, 1946,
Serial No. 668,017

2 Claims. (Cl. 71—44)

This invention relates to the defluorination of phosphatic materials by calcination, and has for its object the provision of certain improvements in that process.

Fluorine is present in practically all native phosphate rocks, in amount varying in the different areas in which it occurs. The fluorine is commonly believed to be present as calcium fluoride and also combined with the tricalcium phosphate as calcium fluorphosphate or fluorapatite, and this combination is believed to be largely responsible for the lower fertilizer efficiency (available $P_2O_5$) of the raw rock, as evidenced by the customary ammonium citrate solubility test. Moreover, the high fluorine content of the raw rock makes it unsuitable as an animal feed or mineral supplement. The so-called superphosphates (the most common form of phosphate used in the fertilizer field) generally contain over 1% and sometimes as much as 2% fluorine, thus making them unsuitable for use as a mineral supplement, for which use the fluorine content should not be in excess of 0.3% or over 1 part of fluorine per 30 parts of phosphorus. However, fluorine can be substantially eliminated from superphosphates by simple calcination.

Among the many proposals for defluorinating raw phosphate rock, the calcination process in the presence of water vapor appears the most promising and a vast amount of work has been done in the endeavor to commercialize that process. Simple calcination in the presence of water vapor at temperatures around 2400° F. will remove a large proportion of the fluorine from ordinary phosphate rocks. However, the removal of that proportion of its total fluorine content readily eliminated by calcination does not greatly or correspondingly increase the fertilizer efficiency of the raw rock, and it is not until the fluorine content is reduced to below 0.5% that the citrate solubility is markedly increased. Calcining temperatures substantially in excess of 2400° F. are necessary to effect substantially complete defluorination (i. e. to a fluorine content less than 0.5%), but at such higher temperatures serious operating difficulties are encountered as a consequence of the tendency of the charge to fuse or sinter to such an extent that it becomes sticky, in whole or in part, and tends to cling or stick to the wall of the calcining apparatus, and, in a rotary kiln, fails to flow freely and easily through the kiln. Such fusion or sintering also prevents access of the water vapor to the charge, thus preventing substantially complete defluorination.

In my U. S. Letters Patent No. 2,446,978, patented August 10, 1948, there is disclosed a process of defluorinating raw phosphate rock in which objectionable fusion of the charge is avoided at calcining temperatures of from 2700 to 3000° F. by mixing with the finely divided phosphate rock from 35 to 45% by weight of finely divided silica. In the copending patent application of Clinton A. Hollingsworth and myself Ser. No. 665,344, filed April 26, 1946, now Patent No. 2,479,389, a defluorinating process in which the calcining charge contains such a small amount of silica, less than 4% and preferably less than 3%, that effective defluorination can be effected at temperatures in excess of 2500° F. without encountering fusion and without the necessity of carefully controlling the calcining temperature which may be as high as 3000° F. And in the copending patent applications of Clinton A. Hollingsworth and myself Ser. Nos. 665,345 and 665,346, filed April 26, 1946, the latter now Patent No. 2,478,200, there is dislosed the inclusion of a compound of aluminum, and particularly aluminum phosphate, in the low-silica phosphate rock charge for promoting and accelerating defluorination.

In practicing the aforementioned processes of defluorination, the phosphate rock should be in a finely divided state, preferably so that at least 65% passes through a 200 mesh U. S. standard Tyler screen and all passes through a 65 mesh screen. Superior results are generally attained by forming the finely ground rock into nodules, pellets, briquets or the like. Nodulizing or the like may be carried out as a preliminary or preparatory operation or may be effected in situ immediately preceding calcination. For example, suitable nodules, generally round in shape and varying in diameter from $1/16$ to 1 inch, may be made by moistening the finely divided rock with water or other suitable liquid and tumbling at room temperature in a rotating cylinder, barrel or the like. From 12 to 18% by weight of water or the like, and generally around 15%, will sufficiently moisten the dry finely divided rock for producing satisfactory nodules by tumbling. Nodules may also be made by drying an aqueous slurry of the rock, and cutting the dried product into suitably sized cubes or other shapes. Nodules may also be made mechanically by briquetting or the like, although nodules so produced are generally too dense or compact for effective subsequent penetration of the water vapor. When calcination is carried out in a rotary kiln, nodulizing may conveniently be effected in situ by making a slurry of the finely divided phosphate rock with from 40 to 50% by weight of water, and heating the slurry and evaporating the water in the low temperature end of the rotating kiln.

The present invention contemplates certain improvements in the nodulizing of finely divided phosphatic material prior to defluorination by calcination. While the invention is especially applicable to the preparation of nodules of raw phosphate rocks for defluorination by calcination in the presence of water vapor, and is herein more particularly described as applied to such rocks, it may be applied with advantage in preparing nodules of any phosphatic material as a preparatory step to defluorination by calcination or heat treatment. The invention aims to impart to such nodules such a degree of strength and hardness or toughness that the nodules withstand subsequent necessary handling and calcination without disintegration and particularly without objectionable dusting in the preliminary stages of calcination, especially in calcining apparatus of the rotary kiln type.

A high degree of strength or toughness of a dried nodule, however made, is very desirable in order to withstand subsequent handling and to prevent objectionable dusting of the nodulized charge during calcination, especially in a rotary kiln. Nodules must be conveyed in some manner from the dried state up to a temperature where slight or mild sintering takes place. In a rotary kiln the nodules are moved from the feed end to the discharge end by means of the slope and rolling action of the kiln. Thus, the nodules are continuously rolling on the kiln lining and upon each other in their passage from the dried state to the stage where the individual nodules undergo a slight sintering action and thereby acquire a certain hardness. This slight or incipient sintering takes place at temperatures from 1700 to 2200° F., and is sufficient to convert the nodules into relatively hard and strong clinkers. Unless the nodules are strong and tough during this stage of the defluorination process, that is up to the point where such slight or incipient sintering takes place, they tend to disintegrate, due to the abrasive action inherent in their movement through the kiln, and make an excessive amount of dust.

Dust is very undesirable in continuous defluorination operations because of the sintering action that takes place at temperatures from 1700 to 2200° F. At these temperatures, dust will cling to the wall of a rotary kiln, or other continuously operated calcining apparatus, and form a low temperature sinter ring which is very objectionable. This low temperature sintering action is not sufficiently strong to bind a nodule to the kiln and thus form a sinter ring of nodules, because the surface of the nodule in contact with the kiln wall is relatively small in relation to the mass of the nodule. However, the sinter ring produced by dust builds up and restricts the diameter of the kiln. As the sinter ring builds up, it forms a dam behind which there is an accumulation of nodules. With the increased detention time and greater depth of nodule bed there is a greater tendency for the rolling or tumbling nodules to make dust. When the sinter ring breaks due to its increasing weight, there is released a flood of dust and nodules. The dust then begins to coat the remaining length of the kiln and at hotter zones where the sinter ring is firm and adherent. With a few repetitions of this cycle a rotary kiln becomes so coated that it is impossible to obtain a sufficient draft through the kiln to maintain a high enough temperature for defluorination, with the result that the kiln must be shut down and the coating dug or cut out. Furthermore, the coating is too high in fluorine content to be marketable without further treatment.

I have found that reasonably hard and strong dried nodules can be formed with some phosphate rocks while the nodules formed with other phosphate rocks are so weak and friable as to be practically incapable of satisfactory defluorination in any continuously operated calcining apparatus, especially of the rotary kiln type. Those phosphate rocks which do make strong nodules contain, when finely ground, a considerable amount of colloidal matter, whereas those rocks which do not make strong nodules are generally crystalline in structure and, when finely ground, contain very little colloidal material. I have further found that the admixture of a small amount of suitable colloidal material with the finely divided phosphate rock imparts an entirely satisfactory degree of nodule hardness and strength in the case of rocks deficient in colloidal material, and usually improves the hardness and strength of nodules made of any finely divided phosphatic material.

Based on the foregoing discoveries, the present invention involves, in the defluorination of phosphatic material by calcination and more especially of raw phosphate rock by calcination in the presence of water vapor, the admixture with the finely divided phosphatic material of a small amount of a suitable colloidal material, and nodulizing the mixture preparatory to calcination. The colloidal material should be inert, should not volatilize or fuse at temperatures below the incipient sintering stage of the phosphate rock (e. g. 1700–2200° F.), and should be capable of acting as an effective bonding agent up to that sintering stage. Naturally hydrated colloidal clays possessing the property of absorbing water freely with pronounced swelling are satisfactory colloidal materials for the purposes of the invention. Bentonite is a typical example of such a clay and is admirably suited to the purposes of the invention. It has the property of taking up water with a swelling action, does not volatilize, and fuses at a temperature in the neighborhood of 2600° F. Bentonite is a naturally hydrated colloidal aluminum silicate generally represented by the formula $Al_2O_3.3SiO_3.nH_2O$, although in certain bentonites some of the alumina ($Al_2O_3$) may be replaced by other oxides such as magnesium oxide, calcium oxide, etc. Bentonite is marketed in a number of grades and stages of refinement, and I have found that any commercially available bentonite is suitable in the practice of the invention.

The colloidal material may be added dry to the dry finely divided phosphatic material, the mixture wetted or made into an aqueous slurry, and the slurry dried and nodulized. Or the colloidal material may be added in the form of a slurry to a slurry of the ground phosphate material. The added colloidal material should be intimately mixed with the phosphatic material so that the effect of its hardening properties is uniformly distributed throughout the mixture and the dried nodules made therefrom.

The amount of colloidal material admixed with the finely divided phosphatic material is determined to some extent by the amount of colloidal material naturally present in the phosphatic material. The admixture of about 0.5% based on the weight of the phosphatic material imparts a desirable degree of strength and toughness to dried nodules made up of any phosphatic material, and where the phosphatic material is deficient in colloidal material up to 3% by weight of added colloidal material may be advantageously included in the calcining charge before nodulizing. While amounts of colloidal material up to 3% by weight can be added to ground phosphate rocks without appreciably increasing the fusion tendency, 2% by weight of added colloidal material is usually adequate even with rocks containing little or no natural colloidal constituents.

Ground phosphate rocks contain varying amounts of colloidal material, depending largely upon the manner in which the rock was formed. Generally speaking, phosphate rocks formed by sedimentary action or enrichment contain considerable but varying amounts of colloidal material, while phosphate rocks formed largely by igneous action are crystalline in structure and contain very little true colloidal material. Phosphates of the sedimentary type include Florida phosphate rock (e. g. pebble rock), North African phosphates, and many of the South Sea Island phosphates, and adequate nodule strength is generally imparted to such finely ground phosphates by 0.5–1% of added colloidal material. Phosphates of the igneous type include the apatites of Virginia, Canada, Russia and some of the western phosphates in the United States, and 1 to 2% or so of added colloidal material may be admixed with such finely ground phosphates to impart satisfactory nodule strength.

Fineness of grinding has some influence on the colloidal content of the ground rock, but I have found that grinding too fine retards the rate of defluorination and is moreover costly, and that within practical limits colloidal content cannot be safely increased in this manner. In practice, I have found that the best results are obtained by grinding to a fineness between 70 and 90% through a 200 mesh Tyler standard screen and all through a 65 mesh screen. Although the colloidal content of a ground phosphatic material can be determined by fractionating the very fine sizes by some sedimentation or air current method, or microscopically, a more practical and more rapid method is to determine the strength of a cube or nodule of a dried slurry made from the ground phosphatic material.

The strength of a cube or nodule of a dried slurry may be conveniently determined or measured by making a slurry of the ground phosphatic material, drying the slurry, and cutting the partially dried slurry into a pattern of cubes when the drying has reached the stage where there is just sufficient moisture present for the material to be cut readily and to hold its shape. The cubes are then dried to completion, cooled and subjected to a compression test. Any testing device that will measure small amounts of compression and in which the breaking or failure of the cube can be noted is suitable. Such a suitable compression device is the platform scale customarily used to measure the weight of shot necessary to break a cement briquet in the standard strength test of the Portland cement industry. For comparative purposes the cubes should be of a uniform size and always made in the same manner. Varying amounts of added colloidal material may be admixed with the ground phosphatic material and tested to determine the necessary or optimum amount for use in practice.

The following examples illustrate the increase in strength imparted to nodules by the admixture of bentonite with the ground phosphatic material. The phosphatic material was a ground Virginia apatite. The dried nodules were ¼ inch cubes, and the examples show the effect of the bentonite in imparting strength to the nodules and holding that strength at elevated temperatures.

| Cube nodules of— | Strength in Units of Cement T. S. Testing Scale | |
|---|---|---|
| | Cold | 800° F. |
| Apatite alone | 67 | 67 |
| Apatite and 0.5% bentonite | 775 | 775 |
| Apatite and 1.0% bentonite | 1,000+ | 1,000+ |
| Apatite and 0.5% flour | 1,000+ | 10 |

It will be noted that while flour imparts a high initial cold strength to the nodules, this strength is not maintained at elevated temperatures since the flour burns off or volatilizes at relatively low temperatures and its hardening property is thus destroyed.

In the copending patent application of Clinton A. Hollingsworth and myself, Ser. No. 665,348 filed April 26, 1946, a highly effective porosity is imparted to nodules of phosphatic material by including from 5 to 50% by weight of carbonaceous material in the nodules and eliminating substantially all of the carbon of the carbonaceous material by reaction with water vapor at a temperature in excess of 1800° F. with evolution of the resulting gaseous products. In the following examples of the practice of the invention of that application, a ground Russian apatite was mixed with 40% of ground bituminous coal and the indicated amounts of bentonite, and dried nodules thereof were subjected to the aforementioned compression strength test, with these results:

| Percent Bentonite | Cold Strength in Units of Cement T. S. Testing Scale |
|---|---|
| None | 0 |
| 0.5 | 45 |
| 1.0 | 100 |

While the porous nodules of these examples do not possess the outstanding strength and hardness of the nodules of the preceding examples, the difference is due to the generally weakened structure of the nodules as a result of the voids left by the elimination of the carbonaceous material. However, the increased strength imparted to these porous nodules by the bentonite enables them to be handled cold, and to reach the stage of decarbonization without objectionable dusting. The incipient or mild sintering taking place at the decarbonizing temperature imparts adequate strength to the resulting porous nodules to undergo defluorination by calcination in the presence of water vapor without objectionable dusting, and the high porosity of the nodules insures easy and complete penetration of water vapor and thus promotes and accelerates defluorination.

I claim:

1. In defluorinating phosphate rock by calcination in the presence of water vapor where the finely divided rock is nodulized prior to calcination at a temperature in excess of 2400° F., the improvement which comprises mixing from 0.5 to 3% by weight of bentonite with the finely divided rock, nodulizing the mixture, and conveying the resulting nodules without objectionable dusting through the low temperature stage of calcination to the stage where incipient sintering converts the nodules into relatively hard and strong clinkers capable of withstanding without substantial disintegration the final high temperature stage of calcination.

2. In defluorinating phosphate rock by calcination in a rotary kiln in the presence of water vapor where the finely divided rock is nodulized prior to calcination at a temperature in excess of 2400° F., the improvement which comprises mixing from 0.5 to 3% by weight of bentonite with the finely divided rock, nodulizing the mixture, and passing the resulting nodules without objectionable dusting through the rotary kiln to the temperature zone where incipient sintering converts the nodules into relatively hard and strong clinkers capable of withstanding without substantial disintegration the hot temperature zone of the kiln.

ERNEST J. MAUST.

REFERENCES CITED

The following references are of record in the file of this patent:

UNITED STATES PATENTS

| Number | Name | Date |
| --- | --- | --- |
| 1,396,149 | Soper | Nov. 8, 1921 |
| 2,162,609 | Dawe | June 13, 1939 |
| 2,189,248 | Luscher | Feb. 6, 1940 |
| 2,279,033 | Dolbear | Apr. 7, 1942 |
| 2,283,174 | Bates | May 19, 1942 |
| 2,366,473 | Bair | Jan. 2, 1945 |

FOREIGN PATENTS

| Number | Country | Date |
| --- | --- | --- |
| 527,302 | Great Britain | Oct. 7, 1940 |

Certificate of Correction

Patent No. 2,499,767

March 7, 1950

ERNEST J. MAUST

It is hereby certified that errors appear in the printed specification of the above numbered patent requiring correction as follows:

Column 2, line 9, after "Patent No. 2,479,389," insert *there is disclosed*; column 6, line 37, for "Russion" read *Russian*;

and that the said Letters Patent should be read with these corrections therein that the same may conform to the record of the case in the Patent Office.

Signed and sealed this 4th day of July, A. D. 1950.

[SEAL]

THOMAS F. MURPHY,
*Assistant Commissioner of Patents.*